United States Patent
Morel et al.

(10) Patent No.: US 6,570,276 B1
(45) Date of Patent: May 27, 2003

(54) VENTILATION DEVICE AND RAIL TRACTION ELECTRIC MOTOR EQUIPPED WITH SUCH A DEVICE

(75) Inventors: Ludovic Morel, Ornans (FR); Jean-Luc Raguideau, Paris (FR); Bruno Raguin, Beure (FR)

(73) Assignee: Alstom, Paris (FR)

( * ) Notice: Subject to any disclaimer, the term of this patent is extended or adjusted under 35 U.S.C. 154(b) by 0 days.

(21) Appl. No.: 09/706,742

(22) Filed: Nov. 7, 2000

(30) Foreign Application Priority Data

Nov. 9, 1999 (FR) .............................. 99 14309

(51) Int. Cl.[7] .............................................. H02K 1/20
(52) U.S. Cl. ...................................................... 310/52
(58) Field of Search ............................. 310/58, 52, 59, 310/62; H02K 1/20, 9/06

(56) References Cited

U.S. PATENT DOCUMENTS

| | | | | |
|---|---|---|---|---|
| 3,383,529 A | * | 5/1968 | Baumann | 310/58 |
| 4,742,257 A | * | 5/1988 | Carpenter | 310/62 |
| 5,000,769 A | * | 3/1991 | Raguideau et al. | 55/406 |
| 5,214,325 A | * | 5/1993 | Matson et al. | 310/58 |
| 5,317,224 A | * | 5/1994 | Ragaly | 310/58 |

FOREIGN PATENT DOCUMENTS

| | | |
|---|---|---|
| DE | 42 42 132 A1 | 6/1994 |
| DE | 297 16 977 U1 | 3/1998 |
| EP | 0 261 295 A1 | 3/1988 |
| EP | 0 387 743 A1 | 9/1990 |
| EP | 0 416 468 A1 | 3/1991 |
| EP | 0 849 858 A1 | 6/1998 |
| JP | 09 233 766 A | 9/1997 |

* cited by examiner

*Primary Examiner*—Nestor Ramirez
*Assistant Examiner*—Karen Beth Addison
(74) *Attorney, Agent, or Firm*—Sughrue Mion, PLLC

(57) ABSTRACT

A ventilation device includes a centrifugal fan (24) capable of rotating in one or both directions, placed in an air inlet chamber (C) and delivering air towards the motor (1). The air stream ($F_1$) delivered by the fan (24) is split into an inner stream ($F_2$), directed towards the interior of a confinement space (E) containing at least the rotor (5) of the motor (1), and an outer stream ($F_3$) directed towards ducts (31) for cooling the stator (8) of the motor (1). The cooling obtained is particularly effective while the risk of soiling the motor is low.

11 Claims, 2 Drawing Sheets

VENTILATION DEVICE AND RAIL TRACTION ELECTRIC MOTOR EQUIPPED WITH SUCH A DEVICE

BACKGROUND OF THE INVENTION

The invention relates to a ventilation device and to a rail traction electric motor equipped with such a device.

In the field of rail traction, an electric motor is generally incorporated at a bogey, under the body of a locomotive or a carriage. As an electric motor can consume a significant amount of electrical power, it needs to be cooled so as to dissipate some of this power and it is known practice to use the ambient atmosphere to do this. However, the surroundings of rail traction motors are generally polluted, on the one hand, because of rubbish which may lie on the track and, on the other hand, because of rain or mud resulting from unfavourable weather conditions. For the above reasons, it is known practice for an electric motor to be protected from its environment by placing filters or gratings over the cooling air intake. It is also known practice for the motor cooling air to be drawn in through a length of trunking, from a region of lower pollution, such as an interior compartment of the train or a region near the roof of a locomotive. These measures introduce significant pressure drops along the path along which the cooling air flows, and this reduces its effectiveness and may lead to soiling of the motor.

Document FR-A-2,645,817 discloses the ventilating of a rail traction motor using air delivered by a fan, some of this air being discharged by centrifuging into an opening facing which there is a separator element. The heaviest particles are removed under the effect of centrifugal forces and are therefore not sent towards the interior volume of the motor. However, the effectiveness of the centrifuging depends essentially on the rotational speed of the inlet fan, which speed is linked to the running speed of the motor. This speed depends on the conditions of use of the motor, it being possible for a motor usually to run at a low speed, particularly in the case of an urban rail vehicle of the tramway or trolley bus type. Furthermore, the air discharged through the peripheral opening plays no part in cooling and the acoustic emissions may be generated by the discharge of part of the air stream directly into the ambient atmosphere.

SUMMARY OF THE INVENTION

It is these drawbacks which the invention more specifically sets out to overcome by proposing a ventilation device in which all of the air delivered by a fan is used to cool the motor while the risks of soiling or pollution are minimized.

With this in mind, the invention relates to a device for ventilating a rail traction electric motor, comprising a centrifugal fan capable of rotating in one or both directions, placed in an air inlet chamber and delivering air towards the motor, characterized in that the air stream delivered by the fan is split into an inner stream, directed towards the interior of a confinement space containing at least the rotor of the motor, and an outer stream directed towards ducts for cooling the stator of the motor.

By virtue of the invention, the air stream delivered by the inlet fan is used to cool both the rotor and the stator of the motor, that proportion of the air which is most likely to be contaminated with relatively heavy particles being directed, under the effect of centrifugal force, outwards, that is to say towards the ducts for cooling the stator, while the less contaminated proportion, which constitutes the inner stream, can be directed towards the interior of the confinement space without major risk of soiling the inside of the motor.

According to advantageous but not compulsory aspects of the invention, the device incorporates one or more of the following features:

The fan delivers into a feed nozzle for the ducts, a partition which separates the internal volume of this nozzle from the confinement space being pierced with at least one communication opening allowing the first stream to circulate. It is possible to provide several openings for communication between the internal volume of the nozzle and the space, these openings being distributed roughly uniformly around a central axis of the motor. It is also possible to envisage for this or these openings to be formed radially on the inside of the path defined by the nozzle for the second stream. By virtue of this aspect of the invention, the first stream of cooling air directed towards the space is "tapped" off the stream directed towards the ducts for cooling the stator, this tapping taking place at an internal face of the nozzle where the most contaminated air, that is to say the air most heavily laden with relatively heavy particles, is furthest away.

There is at least one outlet opening for the first air stream to leave the space. This outlet opening may be formed near the mouth of a duct for cooling the stator. In this case, a rib for separating the air streams leaving this opening and leaving this duct is advantageously provided.

A second fan generates or assists a flow of air inside the confinement space, from the inner stream. This second fan increases the movements of the air in the confinement space and thus improves the effectiveness of the cooling of the elements contained in this space.

The confinement space contains the rotor, an internal central part of the stator, at least one winding associated with this stator or with this motor, part of the central shaft of the motor and, possibly, a second fan. All of the aforementioned elements are thus cooled by the first air stream.

The invention also relates to a rail traction electric motor equipped with a ventilation device as defined hereinabove. Such a motor operates very satisfactorily, including in a contaminated environment, and its particularly effective cooling means that it may be envisaged for a high power motor according to the invention to be made relatively small in size.

BRIEF DESCRIPTION OF THE DRAWINGS

The invention will be better understood and other advantages thereof will emerge more clearly in the light of the description which will follow of two embodiments of a rail traction motor equipped with a ventilation device according to its principle, given merely by way of example and made with reference to the appended drawings, in which.

DETAILED DESCRIPTION OF THE INVENTION

Figure 1:
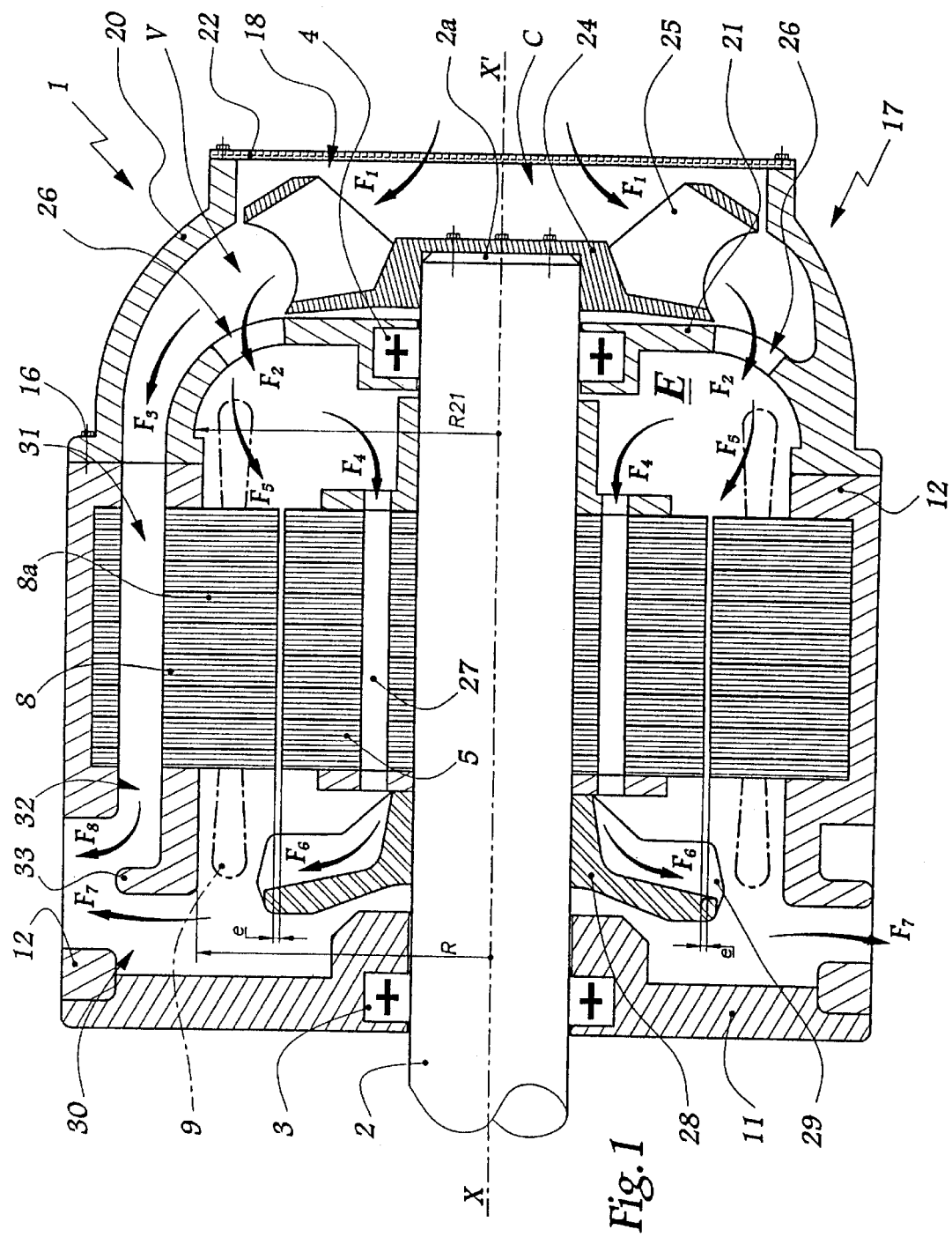
FIG. 1 is a longitudinal section through a rail traction motor according to a first embodiment of the invention.

The motor 1 depicted in FIG. 1 comprises a central shaft 2 supported by bearings 3 and 4 and on which a rotor 5 is mounted.

The longitudinal axis of the shaft 2, which is the axis of rotation of the rotor 5, is denoted X–X'.

A stator 8, centered on the axis X–X', is arranged radially around the rotor 5 and equipped with a winding 9. The gap between the rotor 5 and the stator 8 is denoted e.

An end plate 11 supports the bearing 3 and is connected to a flange 12 which is an integral part of the stator 8.

Furthermore, the flange 12 is connected by screws 16 into a nozzle 17 which defines an inlet orifice 18 for the air for cooling the motor 1 and supports the bearing 4.

The nozzle 17 comprises an outer casing part 20 and an inner casing part 21 defining between them an internal volume V of the nozzle 17, the opening 18 being formed in the part 20, while the bearing 4 is secured to the part 21. A grating 22 is provided in the opening 18 and makes it possible to hold back rubbish such as papers or leaves which may tend to enter the nozzle 17 through the orifice 18.

A fan 24, the radial blades of which are denoted 25, is mounted at one end 2a of the shaft 2, inside an air inlet chamber C formed in the nozzle 17 between the grating 22 and the internal part 21.

Given the shape and arrangement of the elements 11, 12 and 21, these form a confinement space E for the rotor 5, for part of the shaft 2, for an internal part 8a of the stator 8, distant from the axis X–X' by a distance which is shorter than a radius R corresponding approximately to the maximum internal radius $R_{21}$ of the part 21 and of the winding 9. The space E thus allows the elements 5, 8a and 9 to be protected from the ambient atmosphere and, in particular, from dust.

According to the invention, the air stream $F_1$ entering the nozzle 17 through the orifice 18 is delivered by the fan 24 both towards the interior of the space E and towards the stator 8, as depicted by the air streams $F_2$ and $F_3$, respectively.

The internal air stream $F_2$ passes through the openings 26 formed in the part 21 of the nozzle 17, these openings being distributed about the axis X–X'. The air stream $F_2$ entering the space E is split into two air streams $F_4$ and $F_5$. The air stream $F_4$ passes along ducts 27 provided in the rotor 5 parallel to the axis X–X', and this allows the rotor 5 to be cooled effectively. The air stream $F_5$ passes through the gap e between the rotor 5 and the stator 8 and licks the stator.

The circulation of air inside the space E is assisted by a second fan 28 mounted on the shaft 2 inside the space E and the blades 29 of which create a movement which agitates the air from the openings 26 and towards several outlet orifices 30 formed in the flange 12. The arrows $F_6$ and $F_7$ have been used to depict the cooling air stream in the downstream part and at the outlet from the space E, which stream is the result of the combining of the air streams $F_4$ and $F_5$.

The air stream $F_3$ is, for its part, directed towards ducts 31 made in the stator 8 radially outside the part 8a. These ducts 31 may be uniformly distributed around the axis X–X' or localized in certain areas, particularly when the stator has a polygonal outline. For example, when the stator 8 has an octagonal outline whereas its central part is circular, the ducts 31 are formed in four external regions of the cross section of the stator. The air stream $F_3$ allows the stator 8 to be cooled and emerges at $F_8$ through an outlet orifice 32 provided at the downstream end of each duct 31 in the flange 12, near the orifices 30.

There is a rib 33 near each outlet orifice 32 to deflect the stream $F_8$ and thus prevent the creation of a back pressure at the nearby orifice 30.

As the second air stream $F_3$ follows a path, defined by the nozzle 17 and the ducts 31, which is radially outside the path followed by the first stream $F_2$, it is more heavily laden with impurities which are relatively heavy and are centrifuged by the fan 17, but this is not particularly troublesome because the ducts 31 are separated from the internal volume of the motor defined by the space E and because their cross section is large enough to allow its flow. Furthermore, the ducts 31 are basically straight, which means that the stream $F_3$ is not hampered in its flow and the impurities have little tendency towards becoming deposited in the ducts 31.

By contrast, the air stream $F_2$ is relatively clean because the openings 26 are located radially on the inside of the region of radius R, that is to say inside the path of the second air stream. Furthermore, the openings 26 are approximately perpendicular to the air stream $F_3$ in the relevant region of the nozzle 17, the stream $F_3$ constituting the main flow stream, in such a way that the impurities prefer to follow the path of the stream $F_3$.

Thus, the air circulating through the space E is relatively clean and does not risk soiling the rotating parts of the motor 1 or accumulating in the gap e or in the winding 9, even though the path of the air streams $F_4$ to $F_6$ through the space E is relatively tortuous.

Figure 2:
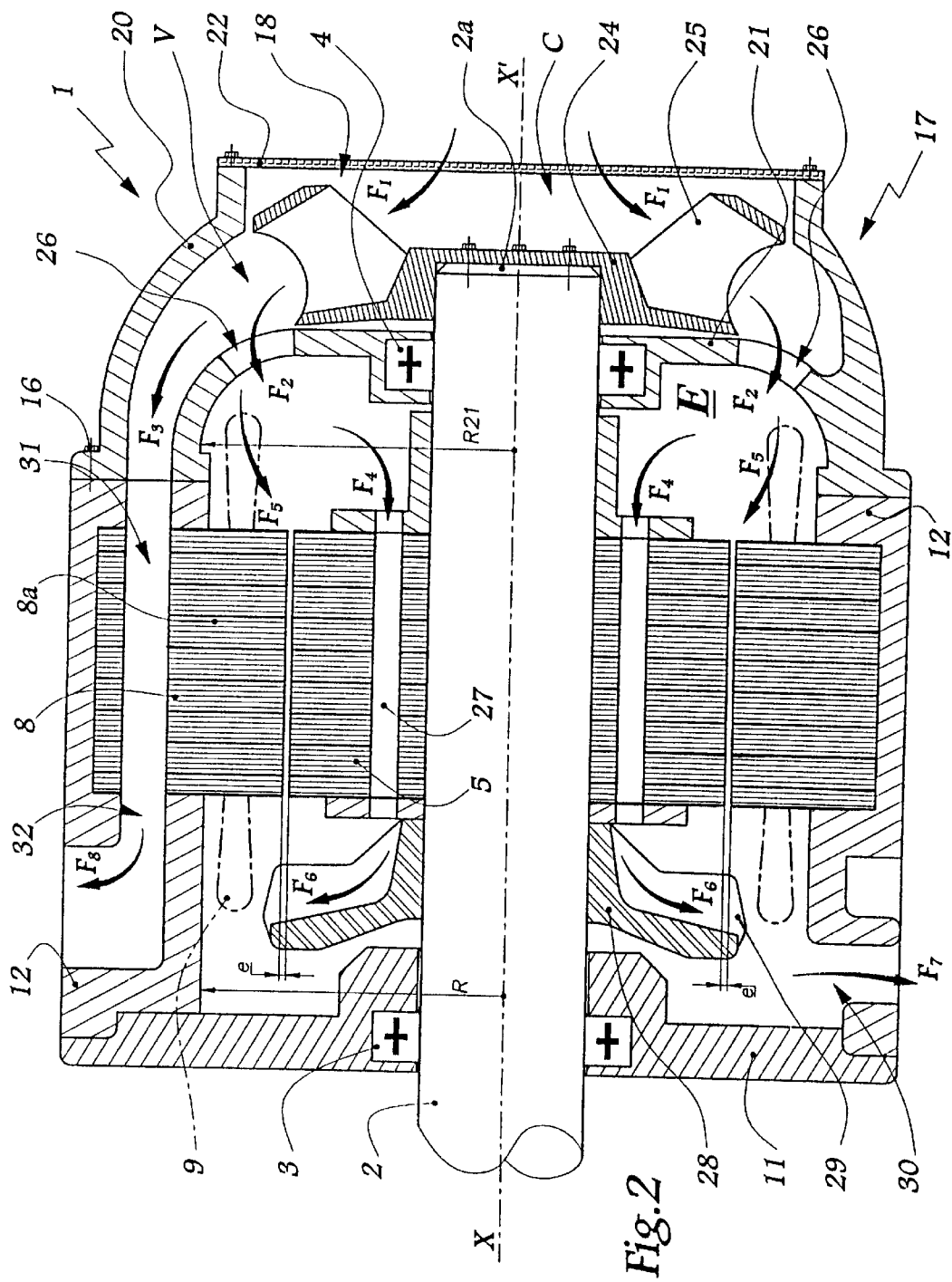
FIG. 2 is a section similar to FIG. 1 in the case of a rail traction motor according to a second embodiment of the invention.

In the second embodiment of the invention, depicted in FIG. 2, the elements which are similar to those of the first embodiment bear identical references. This embodiment differs from the previous one in that the outlet orifices 30 for the internal air stream are offset angularly from the ducts 31. Thus, the outlet orifices 32 via which the external flow emerges, as depicted by the arrow $F_8$, are arranged in such a way that the flows $F_7$ and $F_8$ do not interfere with each other. As depicted in FIG. 2, an orifice 32 may be diametrically opposite an orifice 30.

Whatever the embodiment considered, the cooling obtained is of very good quality because all of the stream $F_1$ is used to cool the motor 1. The diameter of the fan 1 can therefore be small compared with devices of the prior art, and this allows a corresponding reduction in the noise emitted by this fan.

Given the fact that impurities are centrifuged towards the outside of the space E, the grating 22 can have a relatively large mesh size, which reduces the pressure drops incurred and it is not necessary to perform regular maintenance on a filtration element like those fitted to certain motors of the prior art.

The invention is applicable irrespective of the precise type of motor 1, which may be a synchronous motor or an asynchronous motor, of the precise type of fan 24, which may be able to rotate in just one direction or in both directions about the axis X–X', of the type of motor frame which may, in particular, be made of a pack of sheets which is force-fitted into a solid surround, possibly with external fins.

According to an alternative form of the invention, not depicted, the flange 12 may be made in several pieces, particularly so as to make it easier for the stator 8 to be fitted.

What is claimed is:

1. A device for ventilating a rail traction electric motor (1) which includes a stator (8) and a rotor (5), said device comprising a centrifugal fan (24) which rotates coaxially with the rotor (5), is placed in an air inlet chamber (C) and delivers air towards the motor, and a partition (21) which separates said inlet chamber (C) from a confinement space (E) containing at least the rotor (5) and which has at least one opening (26), wherein an air stream ($F_1$) delivered by said fan is split into an inner stream ($F_2$), directed through said at least one opening (26) and then into an interior of the confinement space (E), and an outer stream ($F_3$) directed towards an exterior of the confinement space (E) towards ducts (31) for cooling the stator (8) of the motor.

2. The device according to claim 1, wherein said fan (24) delivers into a feed nozzle (17) for said ducts (31), and said partition (21) separates an internal volume (V) of said nozzle from the space (E).

3. The device according to claim 2, further comprising several openings (26) for communication between the internal volume (V) of the said nozzle (17) and the space (E), said openings being distributed roughly uniformly around a central axis (X–X') of the motor (1).

4. The device according to claim 2, wherein said at least one communication opening (26) is formed radially on an inside of a path defined by said feed nozzle (17) for the outer stream ($F_3$).

5. The device according to claim 1, further comprising at least one outlet opening (30) for the inner air stream ($F_2$) to leave the space (E).

6. The device according to claim 5, wherein said outlet opening (30) is formed near to a mouth (32) of at least one of the ducts (31) for cooling the stator (8).

7. The device according to claim 6, further comprising a rib (33) for separating the air streams ($F_7$, $F_8$) leaving said outlet opening (30) and leaving said at least one duct (31).

8. The device according to claim 1, further comprising a second fan (28) designed to generate or assist an air flow ($F_4$, $F_5$, $F_6$), inside the space (E), from the inner stream ($F_2$).

9. The device according to claim 1, wherein the confinement space (E) contains the rotor (5), an internal radial part (8a) of the stator (8), at least one winding (9) associated with the stator or with the rotor, and part of a central shaft (2) of the motor (1).

10. A rail traction electric motor comprising:

a housing;

a feed nozzle mounted to said housing and defining an inlet orifice for cooling air for cooling said motor, said feed nozzle including an air inlet chamber;

a shaft rotatably supported by bearings in said housing;

a rotor mounted on said shaft;

a stator mounted in said housing and arranged radially around said rotor, said stator having at least one cooling duct passing therethrough; and a ventilation device including a centrifugal fan mounted at one end of said shaft and disposed within said inlet chamber so as to deliver a cooling air stream ($F_1$) from said inlet orifice towards said rotor and said stator, and a partition which separates said inlet chamber from a confinement space containing at least said rotor and which has at least one opening, wherein the air stream ($F_1$) is split into an inner stream ($F_2$) directed through said at least one opening and then into said confinement space, and an outer stream ($F_3$) directed towards an exterior of said confinement space to said at least one cooling duct for cooling said stator.

11. A device for ventilating a rail traction electric motor (1) which includes a stator (8) and a rotor (5), said device comprising a centrifugal fan (24) capable of rotating in one or both directions, placed in an air inlet chamber (C) and delivering air towards the motor, wherein an air stream ($F_1$) delivered by said fan is split into an inner stream ($F_2$), directed towards an interior of a confinement space (E) containing at least the rotor (5) of the motor, and an outer stream ($F_3$) directed towards an exterior of the confinement space (E) towards ducts (31) for cooling the stator (8) of the motor;

said device further comprising at least one outlet opening (30) for the inner air stream ($F_2$) to leave the space (E).

* * * * *